Figure 1:
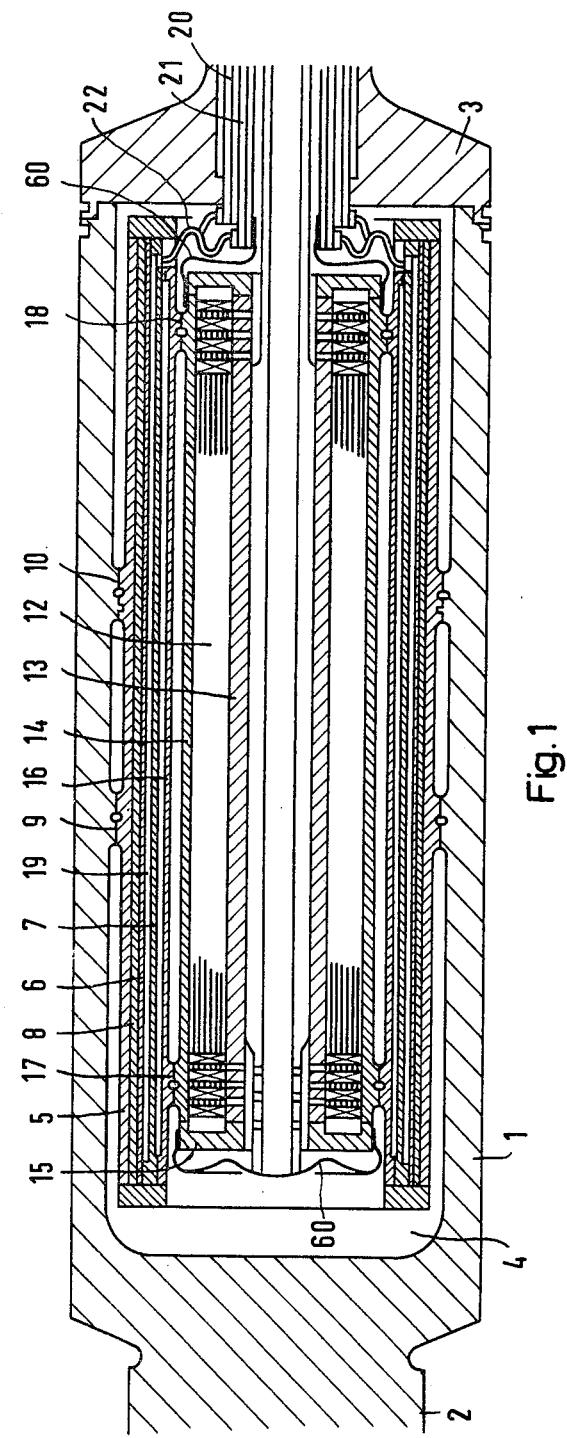

United States Patent [19]

Inticbar et al.

[11] 4,328,437
[45] May 4, 1982

[54] SUPERCONDUCTIVE EXCITER WINDING FOR A TURBOGENERATOR ROTOR

[75] Inventors: Lutz Inticbar, Nuremberg; Heinrich Küter, Wattenscheid; Erich Weghaupt, Mülheim, all of Fed. Rep. of Germany

[73] Assignee: Kraftwerk Union Aktiengesellschaft, Mülheim, Fed. Rep. of Germany

[21] Appl. No.: 766,723

[22] Filed: Feb. 8, 1977

[30] Foreign Application Priority Data

Feb. 12, 1976 [DE] Fed. Rep. of Germany ....... 2605593

[51] Int. Cl.³ .............................................. H02K 9/00
[52] U.S. Cl. ....................................... 310/52; 310/45; 310/165; 310/215
[58] Field of Search ....................... 310/64, 10, 43, 40, 310/45, 52, 61, 58, 59, 214, 215, 165

[56] References Cited

U.S. PATENT DOCUMENTS

| | | | |
|---|---|---|---|
| 2,060,935 | 11/1936 | Grob | 310/215 |
| 3,119,033 | 1/1964 | Horsley | 310/214 |
| 3,324,324 | 6/1967 | Richardson | 310/214 |
| 4,013,908 | 3/1977 | Weghaupt | 310/52 |
| 4,060,743 | 11/1977 | Weghaupt | 310/52 |

FOREIGN PATENT DOCUMENTS

| | | | |
|---|---|---|---|
| 964075 | 5/1957 | Fed. Rep. of Germany | 310/215 |
| 939908 | 11/1948 | France | 310/214 |

*Primary Examiner*—R. Skudy
*Attorney, Agent, or Firm*—Herbert L. Lerner

[57] ABSTRACT

In a turbogenerator rotor, a winding support cylinder coaxially mounted on the rotor and formed with axially extending slots distributed about the periphery thereof, the slots having a radial extending cross section, and a superconductive exciter winding having coils formed of a multiplicity of directly cooled mutually superimposed conductors fixed in the slots, the conductors of a respective coil located at the radially inner part of the slot having a greater cross section than the conductors disposed in the radially outer part of the slot; and method of producing the superconductive exciter winding.

2 Claims, 2 Drawing Figures

SUPERCONDUCTIVE EXCITER WINDING FOR A TURBOGENERATOR ROTOR

The invention relates to a superconductive exciter winding in a turbogenerator rotor wherein winding coils formed of a multiplicity of mutually superimposed, directly cooled conductors are fixed in slots of a winding support.

Such a winding has been described in application Ser. No. 583,158, filed June 2, 1975, of Erich Weghaupt, one of the co-inventors of the instant application. In this earlier application, the winding coil of a slot is formed of a multiplicity of partial coils, the conductors of which, in order to equalize or balance the conically tapering slot, though, in fact, respectively having equal cross-sectional area, nevertheless being provided with a varying profile shape from partial coil to partial coil. Due to this division into a multiplicity of partial coils, numerous conductor connection points result, which should be avoided as much as possible in the case of superconductive windings. Moreover, due to the high magnetic field strength in the region of the lower or radially inner conductors, because of the high constant field which develops through the winding, a varying current loading or carrying capacity of the individual conductors is provided.

It is accordingly an object of the invention to provide a superconductive exciter winding for a turbogenerator rotor, having conductors which exhibit as uniform reliability as possible against reversal of the superconductor to normal conductor or against quenching of the superconductor. Moreover, it is an object of the invention to provide such a superconductive exciter winding with as few conductor connections as possible, and with a form of the coils thereof which will afford a most favorable disposition of the cooling channels as well as most favorable dimensioning of the slot teeth.

With the foregoing and other objects in view, there is provided, in accordance with the invention, in a turbogenerator rotor a winding support cylinder coaxially mounted on the rotor and formed with axially extending slots distributed about the periphery thereof, the slots having a radially extending cross section, and a superconductive exciter winding having coils formed of a multiplicity of directly cooled mutually superimposed conductors fixed in the slots, the conductors of a respective coil located at the radially inner part of the slot having a greater cross section than the conductors disposed in the radially outer part of the slot.

By means of this enlarged cross section of the lower or radially inner conductors, the maximal current load is reduced whereby load equalization or balance for the higher field load is produced.

In accordance with another feature of the invention, the conductors have a rectangular cross section, the conductors in the radially outer part of the slot being mutually superimposed on the longer legs of the rectangular cross section thereof, and the conductors in the radially inner part of the slot being mutually superimposed on the shorter legs of the rectangular cross section thereof, the slot having a stepped construction at the radially inner part thereof and having a smaller width thereat than at the radially outer part thereof.

A stepped, substantially parallel slot affording an adequate tooth width at the base of the slot is thereby produced. Furthermore, the coil is formed of only two conductor profiles so that the number of conductor connections that are required is markedly reduced.

In accordance with a further feature of the invention, a respective coil is received in the slot with two sides thereof facing toward a middle part of the slot, and two plates of insulating material and a wedge plate received in the middle part of the slot, the wedge plate bracing the plates of insulating material respectively against the two sides of the coil, the insulating plates having a respective side thereof facing toward the conductors at the respective sides of the coil, the sides of the insulating plates being formed with cooling channels open toward the conductors and extending in axial direction of the rotor.

In accordance with a concomitant feature of the invention, there is provided a method of producing a superconductive exciter winding of the aforedescribed construction which comprises vacuum-impregnating the winding with impregnating resin after the coils thereof have been inserted into the respective slots and after initially inserting filler members having a shape corresponding to that of the insulation plates formed with cooling channels and the wedge plate into the respective slots instead of the insulation plates and the wedge plate, and thermally hardening the resin so that the conductors are firmly bonded to one another and to the surfaces of the winding support cylinder defining the respective slots, and thereafter removing the filler members and replacing them with the insulation plates and the wedge.

Other features which are considered as characteristic for the invention are set forth in the appended claims.

Although the invention is illustrated and described herein as superconductive exciter winding for a turbogenerator rotor, it is nevertheless not intended to be limited to the details shown, since various modifications may be made therein without departing from the spirit of the invention and within the scope and range of equivalents of the claims.

Figure 2:
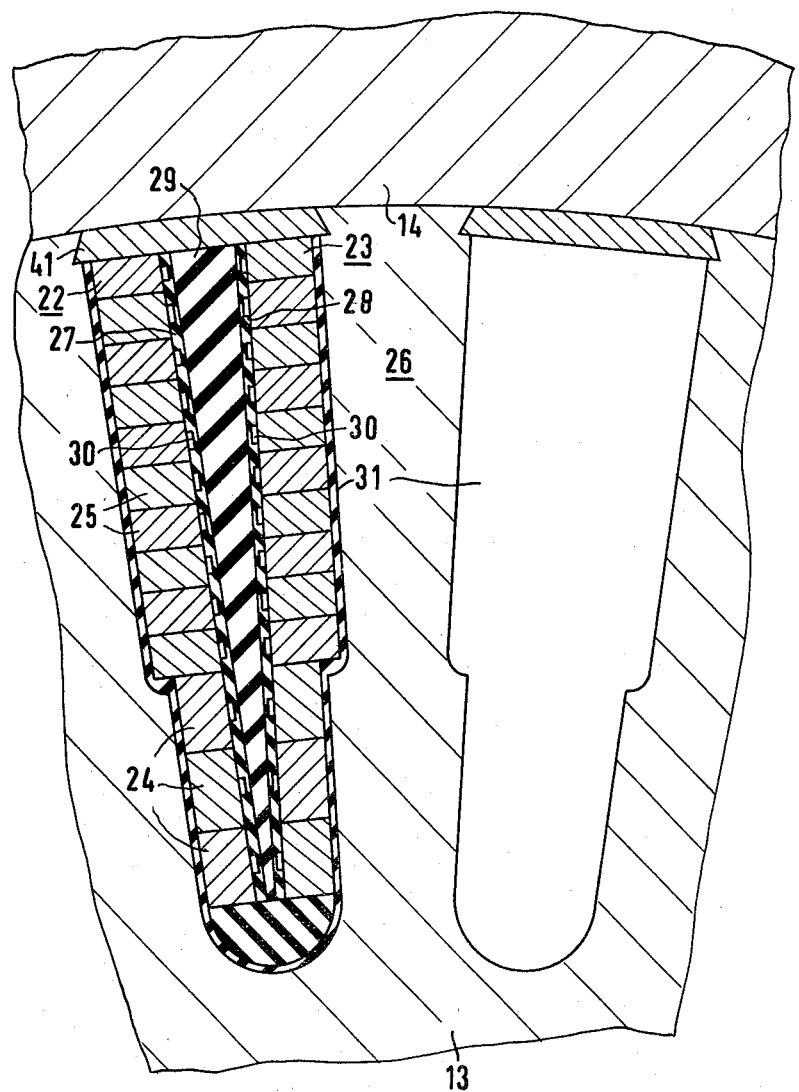

The invention, however, together with additinal object and advantages thereof will be best understood from the following description when read in connection with accompanying drawings, in which:

FIG. 1 is a longitudinal sectional view of the rotor of a turbogenerator incorporating a superconductive exciter winding according to the invention; and FIG. 2 is an enlarged cross-sectional view of one of the slots formed in the support cylinder wherein a superconductive exciter winding is received and is impregnated with impregnating resin.

Referring now to the drawings and first, particularly to FIG. 1 thereof, there is shown an outer rotor body 1 formed as a hollow cylinder and closed at the end 2 thereof facing the turbine and flanged vacuum-tightly to a non-illustrated exciter shaft by a further non-illustrated coupling at the end 3 of the rotor body 1 facing the exciter. The rotor body 1 is formed with an inner chamber 4 that is evacuated. In the inner chamber 4, in radial direction from the outside to the inside thereof, three concentric steel cylinders 5, 6 and 7 with an interposed damper winding 8 are disposed. The three steel cylinders 5, 6 and 7 with the damper winding 8 are connected to the outer rotor body 1 through articulating points 9 and 10 which have a high thermal resistance. The winding coil 22, 23 proper, as can be seen particularly in FIG. 2, is embedded in slots or recesses 31 formed at the outer periphery of a winding support cylinder 13, over which a bracing cylinder 14 is pressfitted. Both cylinders 13 and 14 are force-lockingly connected to each other at their ends through a cover 15 and closed off by caps 60, so that a closed winding space 12 is provided which is separated from the evacuated inner chamber 4.

The cylinders 13 and 14 containing the winding are connected through a spring cylinder 16 and appropriate articulating points 17 and 18 to the three cylinders 5, 6 and 7. The damper formed of the cyliners 5, 6 and 7 and the damper winding 8 also fulfills the function of a cold shield. All of the gaps or spaces between the cylinders 5, 6, 7 and 16 are evacuated.

The damper winding 8 is cooled through cooling channels 19, which are traversed by coolant supplied through concentric channels 20 and 21 and through connecting hoses 22.

As shown in FIG. 2, the winding support cylinder 13 is formed with a distribution of slots 31 spaced-apart uniformly at the periphery thereof. The slots 31 extend in axial direction of the rotor and have a radially extending cross section. Two sides 22 and 23 of the coil are wound into each slot 31 with a respective row of superimposed conductors 24, 25. Because of the high magnetic field strengths in the lower or radially inner part of the slot 31, the conductors 24 disposed thereat therefore are provided, in accordance with the invention, with a greater cross section than are the conductors 25 in the upper or radially outer region of the slot 31, as viewed in FIG. 2, so that the specific current load of the lower conductors 24 is considerably smaller than in the upper or radially outer part of the slot 31. In order, however, to avoid an increase in cross section of the total number of conductors, and thereby an enlargement of the slot 31, it is also possible to increse the specific current load in the upper or radially outer part of the slot 31 by suitably reducing the cross section of the conductors 25. In order to attain, additionally, an optimal dimensioning of the slot teeth 26 also in the region of the slot base, in the illustrated embodiment of FIG. 2, the conductors 25 located in the upper or radially outer part of the slot 31, as viewed in FIG. 2, and which have a respectively rectangular cross section are disposed flatly one on top of the other i.e. muturally superimposed on the longer sides of the rectangular cross section thereof; and the conductors 24 in the lower or radially inner part of the slot 31 are disposed edgewise or upright one above the other i.e. mutually superimposed on the shorter sides of the rectangular cross section thereof. Thereby, a slot 31 is produced having stepped slot flanks and a smaller slot width in the lower or radially inner region thereof, so that an adequate tooth width is still rendered possible at the slot base.

Because of the stepped form of the slot flanks, cooling of the individual conductors 24, 25 advantageously occurs at the inner surface of the sides 22 and 23 of the coil. For this purpose, two plates 27 and 28 of insulating material are inserted into the middle of the slot 31 and are pressed by a wedge 29 against the respective sides 22 and 23 of the coil. The plates 27 and 28 are formed at the sides thereof facing toward the conductors 24 and 25 with channels 30 open toward the conductors 24 and 25 and extending in axial direction of the rotor. A coolant in the form of liquid helium flows through the channels 30 and ensures adequate cooling and temperature-maintenance of the superconductors.

As mentioned hereinbefore, the winding, after being wound into the slot 31, is impregnated with impregnating resin which thereafter is thermally hardened, for which purpose smooth steel plates are initially installed in the slot 31 instead of the plates 27 and 28 of insulating material that are formed with the cooling channels 30. After impregnating with resin and hardening of the resin surrounding the winding, the steel plates are then replaced by the cooling-channel plates 27 and 28 and the wedge plate 29. The individual slots 31 are then closed by slot wedges 41; the bracing per se of the winding against centrifugal force is assumed by the support cylinder 14 shrink-fitted on the outside onto the rotor.

With the hereinaforedescribed construction of the winding conductors and the disposition thereof in the slot, an optimization of the superconductive exciter coils also with respect to the disposition of the cooling channels and the dimensioning of the slot teeth is achieved. Simultaneously, a maximal electrical utilization or exploitation of the superconductor with regard to the local magnetic field strength acting upon a conductor group is produced.

There is claimed:

1. In a turbogenerator rotor, a winding support cylinder coaxially mounted on the rotor and formed with axially extending slots distributed about the periphery thereof, said slots having a radially extending cross section, and a superconductive exciter winding having coils formed of a multiplicity of directly cooled mutually superimposed individual conductors fixed in said slots, each of said individual conductors being formed of superconductive material and having a rectangular cross section, the individual conductors of a respective coil located at the radially inner part of said slot having a greater cross section than the individual conductors disposed in the radially outer part of said slot, the individual conductors in the radially outer part of said slot being mutually superimposed on the longer sides of the rectangular cross section thereof, and the individual conductors in the radially inner part of said slot being mutually superimposed on the shorter sides of the rectangular cross section thereof, said slot having a stepped construction at the radially inner part thereof and having a smaller width thereat than at the radially outer part thereof.

2. In a turbogenerator rotor, a winding support cylinder coaxially mounted on the rotor and formed with axially extending slots distributed about the periphery thereof, said slots having a radially extending cross section, and a superconductive exciter winding having coils formed of a multiplicity of directly cooled mutually superimposed individual conductors fixed in said slots, each of said individual conductors being formed of superconductive material and having a rectangular cross section, the individual conductors of a respective coil located at the radially inner part of said slot having a greater cross section than the individual conductors disposed in the radially outer part of said slot, the individual conductors in the radially outer part of said slot being mutually superimposed on the longer sides of the rectangular cross section thereof, and the individual conductors in the radially inner part of said slot being mutually superimposed on the shorter sides of the rectangular cross section thereof, said slot having a stepped construction at the radially inner part thereof and having a smaller width thereat than at the radially outer part thereof, a respective coil being received in said slot with two sides thereof facing toward a middle part of said slot, and two plates of insulating material and a wedge plate being secured in said middle part of said slot, said wedge plate pressing said plates of insulating material respectively against said two sides of the coil, said insulating plates having a respective side thereof facing toward the individual conductors at the respective sides of the coil, said sides of said insulating plates being formed with cooling channels open toward said individual conductors and extending in axial direction of the rotor.

* * * * *

UNITED STATES PATENT OFFICE
CERTIFICATE OF CORRECTION

PATENT NO. : 4,328,437
DATED : May 4, 1982
INVENTOR(S) : LUTZ INTICHAR, HEINRICH KÜTER, ERICH WEGHAUPT

It is certified that error appears in the above-identified patent and that said Letters Patent are hereby corrected as shown below:

On the title page, line 3 /75/:

"/75/ Inventors:   Lutz Inticbar, Nuremberg: Heinrich"

Should read:

--/75/ Inventors:   Lutz Intichar, Nuremberg; Heinrich--.

Signed and Sealed this

Eighth Day of February 1983

[SEAL]

Attest:

GERALD J. MOSSINGHOFF

Attesting Officer   Commissioner of Patents and Trademarks